(12) United States Patent
Xie et al.

(10) Patent No.: US 9,939,685 B2
(45) Date of Patent: Apr. 10, 2018

(54) LIQUID CRYSTAL PANEL AND METHOD FOR MANUFACTURING THE SAME

(71) Applicants: BOE Technology Group Co., Ltd., Beijing (CN); Hefei Xinsheng Optoelectronics Technology Co., Ltd., Anhui (CN)

(72) Inventors: Xiaolong Xie, Beijing (CN); Xiao Guo, Beijing (CN); Kui Lv, Beijing (CN); Qun Li, Beijing (CN); Kang Xiang, Beijing (CN); Fengzhen Lv, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 105 days.

(21) Appl. No.: 15/233,234

(22) Filed: Aug. 10, 2016

(65) Prior Publication Data

US 2017/0205648 A1    Jul. 20, 2017

(30) Foreign Application Priority Data

Jan. 15, 2016 (CN) .......................... 2016 1 0028576

(51) Int. Cl.
*G02F 1/1339* (2006.01)
*G02F 1/1333* (2006.01)
(Continued)

(52) U.S. Cl.
CPC ........ *G02F 1/1339* (2013.01); *G02F 1/13439* (2013.01); *G02F 1/133345* (2013.01);
(Continued)

(58) Field of Classification Search
CPC ................. G02F 1/1341; G02F 1/1339; G02F 1/133345; G02F 1/133514;
(Continued)

(56) References Cited

U.S. PATENT DOCUMENTS

2009/0015779 A1* 1/2009 Ohashi ................... G02F 1/1341
349/154
2011/0063562 A1* 3/2011 Guo ........................ G02F 1/133
349/158
(Continued)

*Primary Examiner* — Nathanael R Briggs
*Assistant Examiner* — William Peterson
(74) *Attorney, Agent, or Firm* — Westman, Champlin & Koehler, P.A.

(57) ABSTRACT

The present disclosure provides a liquid crystal panel and a method for manufacturing a liquid crystal panel. The liquid crystal panel includes a first substrate, a second substrate arranged opposite to the first substrate, and a sealing frame disposed between the first substrate and the second substrate. The liquid crystal panel further includes a first electrode, a second electrode and a plurality of filling patterns filled in the sealing frame. The filling pattern is made of a piezoelectric material, and a size of the filling pattern is capable to be changed after the first electrode and the second electrode are applied with a voltage to generate an electric field, so as to adjust a height of the liquid crystal panel in a peripheral area thereof.

20 Claims, 6 Drawing Sheets

(51) Int. Cl.
  *G02F 1/1335* (2006.01)
  *G02F 1/1343* (2006.01)
(52) U.S. Cl.
  CPC .. *G02F 1/133514* (2013.01); *G02F 1/134309* (2013.01); *G02F 2001/133394* (2013.01); *G02F 2202/28* (2013.01)
(58) Field of Classification Search
  CPC ........... G02F 1/134309; G02F 1/13439; G02F 2001/133394; G02F 2202/28
  USPC ........................................................ 349/154
  See application file for complete search history.

(56) References Cited

U.S. PATENT DOCUMENTS

| | | | |
|---|---|---|---|
| 2014/0063365 A1* | 3/2014 | Li | G02F 1/13394 349/12 |
| 2015/0109544 A1* | 4/2015 | Yeo | G02F 1/133305 349/12 |

* cited by examiner

LIQUID CRYSTAL PANEL AND METHOD FOR MANUFACTURING THE SAME

CROSS-REFERENCE TO RELATED APPLICATION

This application claims the benefit of Chinese Patent Application No. 201610028576.8, filed on Jan. 15, 2016, entitled "Liquid Crystal Panel and Method for Manufacturing the Same" in the State Intellectual Property Office of China, the whole disclosure of which is incorporated herein by reference.

BACKGROUND OF THE INVENTION

Field of the Invention

The present disclosure relates to a field of display technology, and specifically relates to a liquid crystal panel and a method for manufacturing the liquid crystal panel.

Description of the Related Art

As the manufacture technology of display develops, the liquid crystal display technology develops rapidly, and has gradually replaced the conventional Cathode Ray Tube (CRT) display and becomes a mainstream technology for a flat panel display in future. In the field of liquid crystal display technology, a thin film transistor liquid crystal display (TFT-LCD) is widely applied to fields such as television, computer, mobile phone and the like since it has advantages, such as large size, high integration level, powerful function, flexible process, and low cost.

A liquid crystal panel is generally made by assembling an array substrate and a color filter substrate and filling with liquid crystal molecules. The liquid crystal panel has a display area and a peripheral area, and the array substrate and the color filter substrate are sealed by a seal glue in the peripheral area.

In order to keep a certain assembly thickness of the liquid crystal panel in the peripheral area, silicon sphere or glass fiber is generally incorporated into the seal glue, since the silicon sphere or the glass fiber has a relatively high hardness, and is capable of playing a good supporting effect. However, the size of the silicon sphere and the glass fiber cannot be selected arbitrarily, and thus it causes the assembly thickness of the liquid crystal panel in the peripheral area to be non-uniform, and results in the defect for example peripheral Mura, etc.

SUMMARY OF THE INVENTION

In order to solve or eliminate at least a part of the above mentioned technical problems or technical drawbacks, the present disclosure provides a liquid crystal panel and a method for manufacturing the liquid crystal panel, so that the thickness of the liquid crystal panel in a peripheral area thereof is adjustable.

In an aspect of the present disclosure, there is provided a liquid crystal panel, comprising a first substrate, a second substrate arranged opposite to the first substrate, and a sealing frame disposed between the first substrate and the second substrate, wherein the liquid crystal panel further comprises a first electrode, a second electrode and a plurality of filling patterns filled in the sealing frame, the filling pattern is made of a piezoelectric material, and a size of the filling pattern is capable to be changed after the first electrode and the second electrode are applied with a voltage to generate an electric field, so as to adjust a height of the liquid crystal panel in a peripheral area thereof.

In one example, one of the first electrode and the second electrode is disposed between the sealing frame and the first substrate, and the other of the first electrode and the second electrode is disposed between the sealing frame and the second substrate.

In one example, both the first electrode and the second electrode are disposed between the first or second substrate and the sealing frame, and the first electrode and the second electrode are arranged alternately in a same one layer.

In one example, both the first electrode and the second electrode are disposed between the first or second substrate and the sealing frame, and an insulation layer is provided between the second electrode and the first electrode, wherein the first electrode is a plate-shaped electrode and the second electrode is composed of a plurality of strip-shaped electrodes.

In one example, the sealing frame comprises a seal glue, in which the filling pattern is filled.

In one example, the sealing frame comprises an elastic cushion and a seal glue bonded with the elastic cushion, and the filling pattern is filled in the elastic cushion.

In one example, the piezoelectric material is any one chosen from a piezoelectric crystal, a piezoelectric ceramic, a piezoelectric polymer and a piezoelectric ceramic-polymer composite material.

In one example, the filling pattern has any shape chosen from a sphere, a cylinder, a cuboid and a circular truncated cone.

In one example, the first substrate is a color filter substrate and the second substrate is an array substrate, or the first substrate is an array substrate and the second substrate is a color filter substrate.

In another aspect of the present application, it provides a method for manufacturing a liquid crystal panel, the liquid crystal panel comprising a first substrate, a second substrate arranged opposite to the first substrate, and a sealing frame disposed between the first substrate and the second substrate, wherein the method comprises:

forming a first electrode, a second electrode and a sealing frame between the first substrate and the second substrate, wherein the sealing frame is filled with a filling pattern, and the filling pattern is made of a piezoelectric material, and a size of the filling pattern is capable to be changed after the first electrode and the second electrode are applied with a voltage to generate an electric field, so as to adjust a height of the liquid crystal panel in a peripheral area thereof.

In one example, the step of forming the first electrode and the second electrode between the first substrate and the second substrate comprises:

forming a pattern comprising one of the first electrode and the second electrode on the first substrate by a patterning process; and forming a pattern comprising the other of the first electrode and the second electrode on the second substrate by a patterning process.

In one example, the step of forming the first electrode and the second electrode between the first substrate and the second substrate comprises:

forming a pattern comprising the first electrode and the second electrode on the first or second substrate by single patterning process, wherein the first electrode and the second electrode are composed of strip-shaped electrodes arranged alternately in a same one layer.

In one example, the step of forming the first electrode and the second electrode between the first substrate and the second substrate comprises steps of:

forming a pattern comprising one of the first electrode and the second electrode on the first substrate by a patterning process;

forming an inter-layer insulation layer; and forming a pattern comprising the other of the first electrode and the second electrode by a patterning process, wherein the first electrode is composed of strip-shaped electrodes and the second electrode is a plate-shaped electrode.

In one example, the sealing frame comprises a seal glue, in which the filling pattern is filled, and the step of forming the sealing frame comprises:

producing the filling pattern by a solid phase method or a liquid phase method; and placing the filling pattern in a material of a seal glue, coating them to the first substrate or the second substrate after being uniformly stirred, assembling the second substrate to the first substrate, and forming the sealing frame via thermal curing or ultraviolet light curing.

In one example, the sealing frame comprises an elastic cushion and a seal glue bonded with the elastic cushion, and the filling pattern is filled in the elastic cushion, wherein the step of forming the sealing frame comprises:

producing the filling pattern by a solid phase method or a liquid phase method;

mixing the filling pattern in a material of the elastic cushion, coating the elastic cushion mixed with the filling pattern to the first substrate or the second substrate, and forming a pattern comprising the elastic cushion by a patterning process; and coating the seal glue so that the seal glue and the elastic cushion are bonded to each other to form the sealing frame.

In one example, the solid phase method is any one chosen from a phase method, a microwave radiation method, a mechanochemical method and a reaction sintering method; and the liquid phase method is any one chosen from a sol-gel method, a hydrothermal method and a precipitation method.

In one example, the piezoelectric material is any one chosen from a piezoelectric crystal, a piezoelectric ceramic, a piezoelectric polymer and a piezoelectric ceramic-polymer composite material.

In one example, the filling pattern has any shape chosen from a sphere, a cylinder, a cuboid and a circular truncated cone.

In one example, the first substrate is a color filter substrate and the second substrate is an array substrate; or the first substrate is an array substrate and the second substrate is a color filter substrate.

Figure 1:
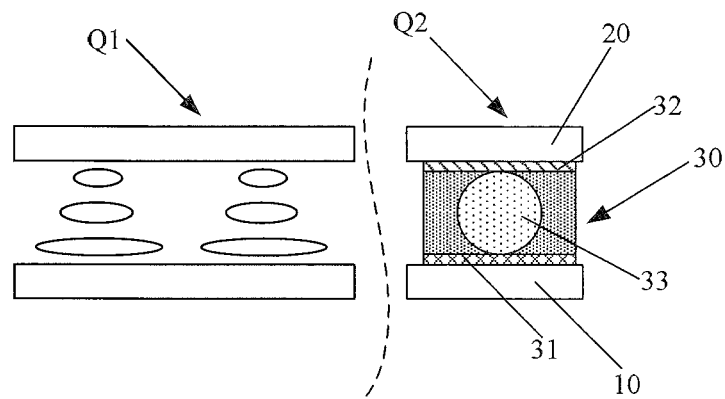
FIG. 1 is a schematic structure view of a liquid crystal panel according to a first embodiment of the present disclosure.

Explanation of reference numerals in the drawings:

Q1, display area; Q2, peripheral area; 10, first substrate; 20, second substrate; 30, sealing frame; 31, first electrode; 32, second electrode; 33, filling pattern; 34, seal glue; 35, elastic cushion.

DETAILED DESCRIPTION OF PREFERRED EMBODIMENTS OF THE INVENTION

In order to provide a better understanding to the technical solutions of the present disclosure for the person skilled in the art, the present disclosure will be further described in detail with reference to the accompanying drawings and the specific embodiments.

First Embodiment

This embodiment provides a liquid crystal panel, which includes a first substrate 10, a second substrate 20 arranged opposite to the first substrate 10, and a sealing frame 30 disposed between the first substrate 10 and the second substrate 20, wherein the sealing frame 30 is configured to seal the first substrate 10 and second substrate 20 after being assembled together.

In particular, as shown in FIG. 1, the sealing frame 30 in this embodiment is filled with a plurality of filling patterns 33 made of a piezoelectric material, which is used to replace a silicon sphere filled in the sealing frame 30 in the prior art. Further, a first electrode 31 and a second electrode 32 are formed between the first substrate 10 and the second substrate 20. The filling pattern 33 will deform after the first electrode 31 and the second electrode 32 are applied with different voltages to generate a certain electric field, so as to adjust a height of the filling pattern 33 and therefore adjust a height of the liquid crystal panel in a peripheral area Q2 thereof.

Figure 2:
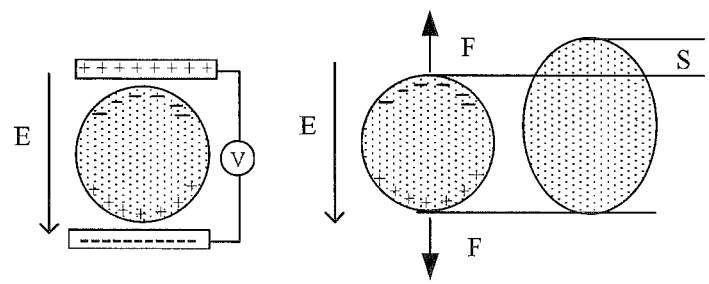
FIG. 2 is a piezoelectric effect principle diagram of a piezoelectric material.

In detail, as shown in FIG. 2, it is well known to the person skilled in the art that the piezoelectric material is of a dielectric, which has two effects under the action of an electric field, i.e., an inverse piezoelectric effect and an electrostrictive effect. The inverse piezoelectric effect is meant that the dielectric is capable of deforming under the action of an external electric field, the magnitude of the deformation is proportional to the magnitude of the electric field, and the direction of the deformation is associated with the direction of the electric field. The electrostrictive effect is meant that the dielectric is capable of deforming under the action of an electric field due to induced polarization effect, and the deformation is independent of the direction of the electric field and the magnitude of the deformation is proportional to the square of the electric field intensity. The above effects may be formulated as follows: $S=dE+ME^2$, where s is the magnitude of the deformation, dE refers to the inverse piezoelectric effect, $ME^2$ refers to the electrostrictive effect, D is a piezoelectric coefficient (m/V), M is an electrostrictive coefficient ($m^2/V^2$), and E is the electric field intensity. The inverse piezoelectric effect and the electrostrictive effect of piezoelectric ceramic essentially refer to that the dielectric is polarized under the action of an electric field, further generates a deformation under the action of an electric field force, which macroscopically exhibits an electromechanical coupling effect.

In the present embodiment, what are applied are the above characteristics of the piezoelectric material, that is, the filling pattern 33 made of the piezoelectric material is used to replace the silicon sphere in the prior art, to be mixed in the sealing frame 30. Thus, the filling pattern 33 made of the piezoelectric material generates a deformation under the action the electric field generated by applying a voltage to the first electrode 31 and the second electrode 32, and the electric field generated between two electrodes may be adjusted by adjusting the level of the applied voltage to the first electrode 31 and the second electrode 32, further the magnitude of the deformation (size) of the filling pattern 33 may be adjusted, and finally the adjustment to the thickness of the liquid crystal panel in the peripheral area Q2 thereof may be achieved.

Second Embodiment

This embodiment provides a liquid crystal panel, comprising a first substrate 10, a second substrate 20 arranged opposite to the first substrate 10, and a sealing frame 30 disposed between the first substrate 10 and the second substrate 20, wherein the sealing frame 30 is configured to seal the first substrate 10 and second substrate 20 after being assembled together. The liquid crystal panel further comprises a first electrode 31 disposed between the first substrate 10 and the sealing frame 30, and a second electrode 32 disposed between the second substrate 20 and the sealing frame 30. The sealing frame 30 is filled with filling patterns 33 made of a piezoelectric material, and adapted to change size thereof after the first electrode 31 and the second electrode 32 are applied with a voltage to generate an electric field, so as to adjust a height of the liquid crystal panel in a peripheral area Q2 thereof. It should be noted that the first electrode and the second electrode herein are intended to easily distinguish from each other, therefore, "the first electrode 31 disposed between the first substrate 10 and the sealing frame 30, and the second electrode 32 disposed between the second substrate 20 and the sealing frame 30" means that there is provided an electrode between the first and second substrates 10, 20 and the sealing frame 30, respectively.

In particular, as shown in FIG. 1, the first electrode 31 and the second electrode 32 are arranged opposite to each other, and the filling pattern 33 is disposed between the first electrode 31 and second electrode 32. If a voltage is applied to the first electrode 31 and second electrode 32, then a vertical electric field will be generated, and if the vertical electric field is applied to the filling pattern 33, then the filling pattern 33 will generate a deformation, with a deformation direction being identical to the direction of the electric field. In other word, the filling pattern 33 will be lengthened in the vertical direction, thereby increasing the height of the liquid crystal panel in the peripheral area Q2 thereof. In such a way, it solves the peripheral Mura problem in the case that the height of the liquid crystal panel in the peripheral area Q2 thereof is less than that in the display area Q1 due to the fixed dimension of the silicon sphere in the prior art.

Figure 3:
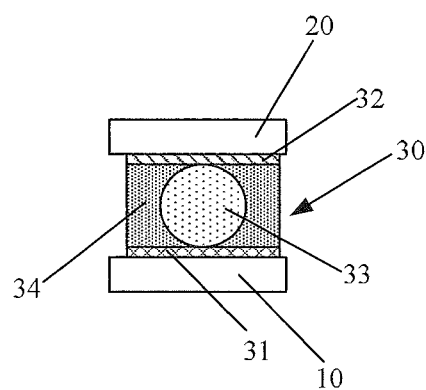
FIG. 3 is a schematic structure view of a liquid crystal panel according to a second embodiment of the present disclosure.

As a preferable implementation of the present embodiment, as shown in FIG. 3, the sealing frame 30 includes a seal glue 34, in which the filling patterns 33 are filled. In this case, the prepared filling pattern 33 in advance is mixed with the seal glue 34, and they are coated onto the first electrode 31 or the second electrode 32 after being uniformly stirred. In such a way, the sealing frame 30 of such structure may be easily manufactured by a simple process.

Figure 4:
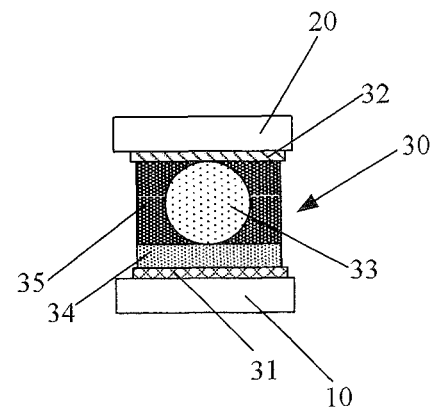
FIG. 4 is a schematic structure view of another liquid crystal panel according to the second embodiment of the present disclosure.

As a further preferable implementation of the present embodiment, as shown in FIG. 4, the sealing frame 30 includes an elastic cushion 35 and a seal glue 34 bonded with the elastic cushion 35, and the filling patterns 33 are filled in the elastic cushion 35. It should be noted herein that the hardness of the elastic cushion 35 should be less that of the seal glue 34. In this case, in contrast to the previous implementation, after an electric field is generated between the first electrode 31 and the second electrode 32, due to the elastic cushion 35 to be soft in terms of materials, the filling pattern 33 is filled in the elastic cushion 35, the filling patterns 33 are therefore more easily to generate a deformation under the effect of the electric field, thus it more facilitates adjusting the height of the liquid crystal panel in the peripheral area Q2 thereof.

In the present embodiment, the above-described piezoelectric material may be chosen as any of a piezoelectric crystal, a piezoelectric ceramic, a piezoelectric polymer and a piezoelectric ceramic-polymer composite material. However, the piezoelectric material is not limited to the several above-described materials, the piezoelectric material may be selected correspondingly in the present embodiment as required.

In the present embodiment, the above-described filling pattern 33 has a shape chosen as any of a sphere, a cylinder, a cuboid and a circular truncated cone. However, the filling pattern 33 may have any other shapes. Preferably, the filling pattern 33 has a sphere shape, since such filling pattern 33 is more easily to generate a deformation under the action of an electric field.

In the present embodiment, one of the above-described first substrate 10 and second substrate 20 is an array substrate, and the other is a color filter substrate. Of course, one of the first substrate 10 and the second substrate 20 may also be a COA substrate, and the other is an assembly substrate. In the present embodiment, the first substrate 10 and the second substrate 20 are not limited herein.

Figure 7:
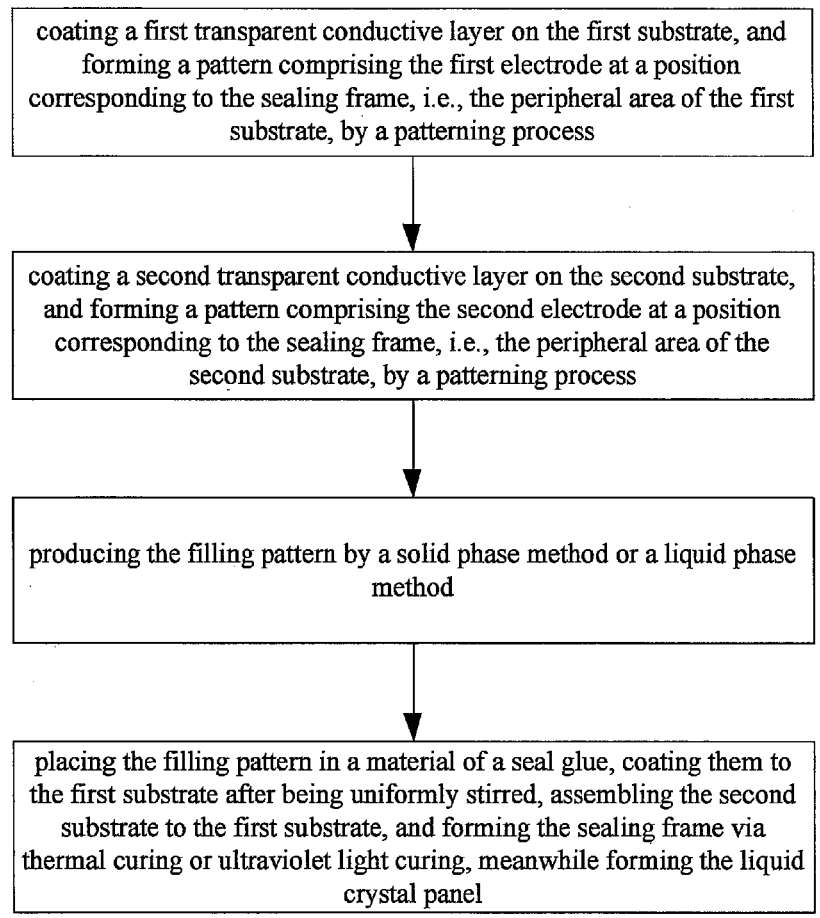
FIG. 7 is a flow chart of a method for manufacturing the liquid crystal panel according to the second embodiment of the present disclosure.
Figure 8:
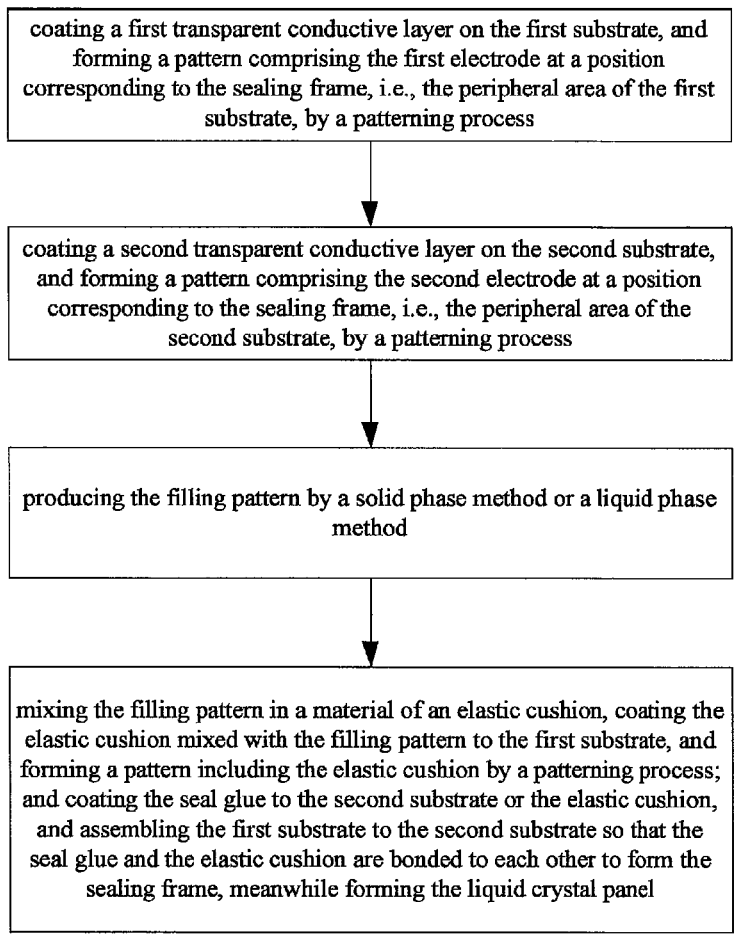
FIG. 8 is a flow chart of a method for manufacturing another liquid crystal panel according to the second embodiment of the present disclosure.

Accordingly, as shown in FIGS. 7 and 8, there is provided a manufacturing method for the above-described liquid crystal panel, in the present embodiment, including steps of:

Step I: coating a first transparent conductive layer on the first substrate 10, and forming a pattern including the first electrode 31 at a position corresponding to the sealing frame 30, i.e., the peripheral area Q2 of the first substrate 10, by a patterning process.

Preferably, the first transparent conductive layer is made of a material of indium tin oxide (ITO). However, any other transparent conductive materials may be employed, not to be listed here.

Step II: coating a second transparent conductive layer on the second substrate 20, and forming a pattern including the second electrode 32 at a position corresponding to the sealing frame 30, i.e., the peripheral area Q2 of the second substrate 20, by a patterning process.

Preferably, the second transparent conductive layer is also made of a material of indium tin oxide (ITO). However, any other transparent conductive materials may be employed, not to be listed here.

Step III: preparing the filling pattern 33 by a solid phase method or a liquid phase method.

The solid phase method includes any of a phase method, a microwave radiation method, a mechanochemical method and a reaction sintering method, and the liquid phase method includes any of a sol-gel method, a hydrothermal method and a precipitation method.

The prepared filling pattern 33 has a shape chosen as any of a sphere, a cylinder, a cuboid and a circular truncated cone. However, the filling pattern 33 may have any other suitable shapes. Preferably, the filling pattern 33 has a sphere shape, since such filling pattern 33 is more easily to generate a deformation under the action of an electric field. It should be noted that the filling patterns 33 with different shapes may be prepared through using corresponding molds by the person skilled in the art, which is not to be described in detail here.

The filling pattern 33 is made of a piezoelectric material, which may be any one chosen from a piezoelectric crystal, a piezoelectric ceramic, a piezoelectric polymer and a piezoelectric ceramic-polymer composite material. However, the piezoelectric material is not limited to the several above-described materials, but the piezoelectric material may be selected to any other corresponding and suitable materials in the present embodiment as required.

As shown in FIG. 7, if the sealing frame 30 includes the seal glue 34, in which the filling patterns 33 are filled, then the step IV specifically includes:

placing the filling patterns 33 into a material of seal glue 34, coating them to the first substrate 10 after being uniformly stirred, assembling the second substrate 20 to the first substrate 10, and forming the sealing frame 30 via thermal curing or ultraviolet light curing, meanwhile forming the liquid crystal panel.

As shown in FIG. 8, if the sealing frame 30 includes the elastic cushion 35 and the seal glue 34 bonded with the elastic cushion 35, and the filling patterns 33 are filled in the elastic cushion 35, then the step IV specifically includes:

mixing the filling pattern 33 in a material of the elastic cushion 35, coating the elastic cushion 35 mixed with the filling pattern 33 to the first substrate 10, and forming a pattern including the elastic cushion 35 by a patterning process; and coating the seal glue 34 to the second substrate 20 or the elastic cushion 35, and assembling the first substrate 10 to the second substrate 20 so that the seal glue 34 and the elastic cushion 35 are bonded to each other to form the sealing frame 30, meanwhile forming the liquid crystal panel.

It should be noted that, in the four above-described steps, the sequence of the steps I to III can be changed as required, and the above-described sequence of the steps I to III is only exemplary, and not intended to limit the present embodiment. In the present embodiment, one of the above-described first substrate 10 and second substrate 20 is an array substrate, and the other is a color filter substrate. Of course, one of the first substrate 10 and the second substrate 20 may also be a COA substrate, and the other is an assembly substrate. In the present embodiment, the first substrate 10 and the second substrate 20 are not limited herein.

As for the liquid crystal panel produced by the manufacturing method according to the present embodiment, the filling patterns 33 made of the piezoelectric material are filled in the sealing frame 30, the filling pattern 33 generates a deformation under the action the electric field generated by applying a voltage to the first electrode 31 and the second electrode 32, and the electric field generated between two electrodes may be adjusted by adjusting the level of the applied voltage to the first electrode 31 and the second electrode 32, further the magnitude of the deformation (size) of the filling pattern 33 may be adjusted, and finally the adjustment to the thickness of the liquid crystal panel in the peripheral area Q2 thereof may be achieved.

Third Embodiment

In this embodiment, there is provided a liquid crystal panel, the structure of which is substantially the same as the second embodiment, except the arrangement position of the first electrode 31 and the second electrode 32. In the present embodiment, both the first electrode 31 and the second electrode 32 are disposed on the first substrate 10, whereas the other structures, such as the sealing frame 30, are identical to the second embodiment, not to be described in detail here. Next, the liquid crystal panel of the present embodiment will be described with reference to the two following specific implementations.

Figure 5:
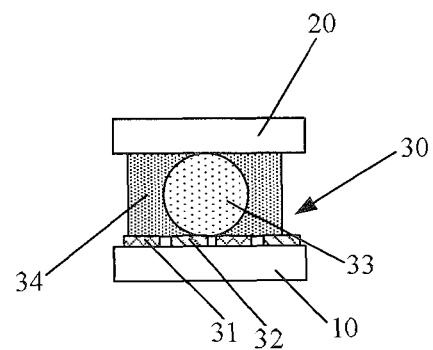
FIG. 5 is a schematic structure view of a liquid crystal panel according to a third embodiment of the present disclosure.

As a preferable implementation of the present embodiment, as shown in FIG. 5, both the first electrode 31 and the second electrode 32 are disposed on the first substrate 10 or the second substrate 20 of the liquid crystal panel, to be taken as an example here, being disposed on the first substrate 10. As an example, the first electrode 31 and the second electrode 32 are strip-shaped electrodes, which are arranged alternately in a same one layer. At this time, if a voltage is applied to the first electrode 31 and second electrode 32, then a horizontal electric field will be generated. Such horizontal electric field is applied to the filling pattern 33 in the sealing frame 30, and then the filling pattern 33 will generate a deformation in the horizontal direction. In other word, the filling pattern 33 will be lengthened in the horizontal direction, thereby decreasing the height of the liquid crystal panel in the peripheral area Q2 thereof. As a result, it avoids the non-uniform problem of the thickness of the liquid crystal panel between the display area Q1 and the peripheral area Q2 thereof, due to the thickness of the sealing frame 30.

Figure 6:
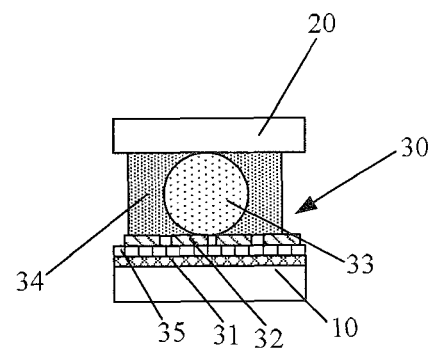
FIG. 6 is a schematic structure view of another liquid crystal panel according to the third embodiment of the present disclosure.

As another preferable implementation of another embodiment, as shown in FIG. 6, the first electrode 31 is disposed on the first substrate 10, the second electrode 32 is disposed above the first electrode 31 and insulated from the first electrode 31, wherein the first electrode 31 is a plate-shaped electrode and the second electrode 32 is composed of strip-shaped electrodes. In this case, if different voltages are applied to the first electrode 31 and the second electrode 32, then a multi-dimensional electric field will be generated, and the filling patterns 33 will generate deformation in the horizontal and/or vertical direction. In other word, the filling pattern 33 will be lengthened in the horizontal and/or vertical direction, thereby decreasing the height of the liquid crystal panel in the peripheral area Q2 thereof. As a result, it avoids the non-uniform problem of the thickness of the liquid crystal panel between the display area Q1 and the peripheral area Q2 thereof, due to the thickness of the sealing frame 30. Alternatively, the second electrode 32 is disposed on the first substrate 10, the first electrode 31 is disposed above the second electrode 32 and the first electrode 31 and the second electrode 32 are insulated from each other, wherein the first electrode 31 is a plate-shaped electrode and the second electrode 32 is composed of strip-shaped electrodes. In other words, the first electrode 31 and the second electrode 32 of the present disclosure may be interchanged with each other in arrangement position, structure, or the like.

Figure 9:
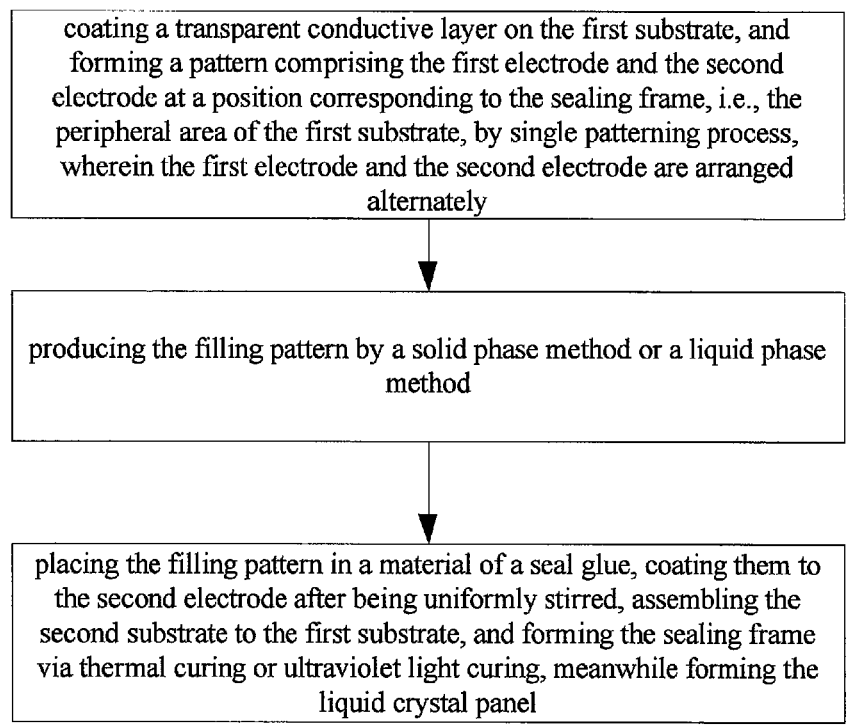
FIG. 9 is a flow chart of a method for manufacturing the liquid crystal panel according to the third embodiment of the present disclosure.
Figure 10:
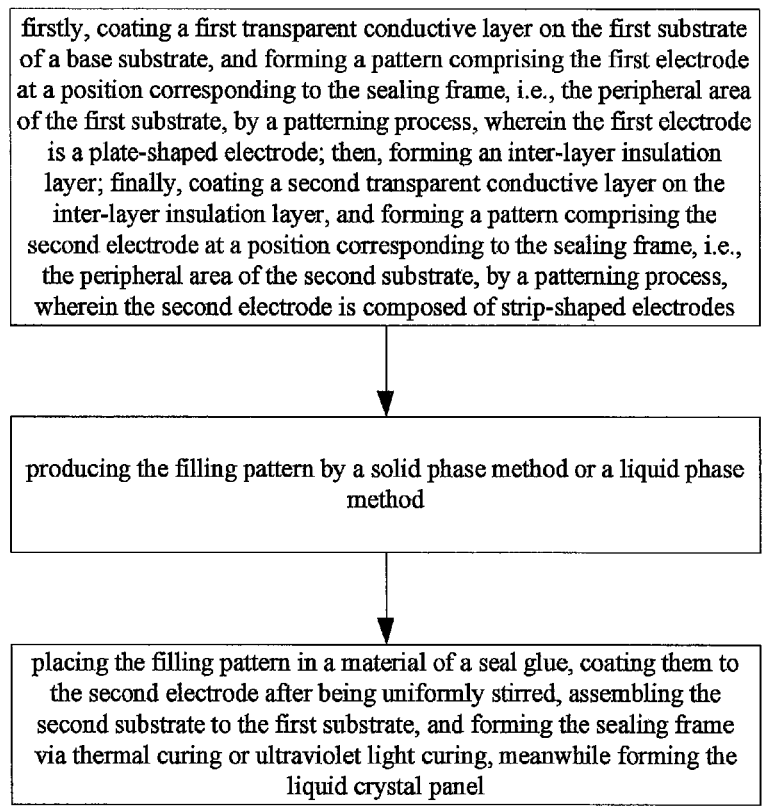
FIG. 10 is a flow chart of a method for manufacturing another liquid crystal panel according to the third embodiment of the present disclosure.

Accordingly, as shown in FIGS. 9 and 10, there is provided a manufacturing method for the above-described liquid crystal panel, in the present embodiment, comprising steps of:

Step I:

When the first electrode 31 and the second electrode 32 are arranged alternately disposed in a same one, as shown in FIG. 9, the step I comprises:

coating a transparent conductive layer on the first substrate 10 (the first substrate 10 is taken as an example, alternatively, the second substrate 20 is available), and forming a pattern comprising the first electrode 31 and the second electrode 32 on a position corresponding to the sealing frame 30, i.e., the peripheral area Q2 of the first substrate 10, by single patterning process, wherein the first electrode 31 and the second electrode 32 are alternately arranged.

Preferably, the transparent conductive layer is indium tin oxide (ITO). However, any other transparent conductive materials may be employed, not to be listed here.

When the first electrode 31 and the second electrode 32 are disposed in different layers, and insulated from each other, as shown in FIG. 10, the step I comprises:

Firstly, coating a first transparent conductive layer on the first substrate 10 (the first substrate 10 is taken as an example, alternatively, the second substrate 20 is available), and forming a pattern comprising the first electrode 31 on a position corresponding to the sealing frame 30, i.e., the peripheral area Q2 of the first substrate 10, by a patterning process, wherein the first electrode 31 is a plate electrode; then, forming an inter-layer insulation layer; finally, coating a second transparent conductive layer on the inter-layer insulation layer, and forming a pattern comprising the second electrode 32 on a position corresponding to the sealing frame 30, i.e., the peripheral area Q2 of the second substrate 20, by a patterning process, wherein the second electrode 32 is a strip-shaped electrode.

Preferably, the first and second transparent conductive layers are indium tin oxide (ITO). However, any other transparent conductive materials may be employed, not to be listed here.

Step II: preparing the filling pattern 33 by a solid phase method or a liquid phase method.

The solid phase method is one chosen from a phase method, a microwave radiation method, a mechanochemical method and a reaction sintering method, and the liquid phase method is one chosen from a sol-gel method, a hydrothermal method and a precipitation method.

The prepared filling pattern 33 has a shape chosen from a sphere, a cylinder, a cuboid and a circular truncated cone. However, the filling pattern 33 may have any other shapes. Preferably, the filling pattern 33 has a sphere shape, since such a filling pattern 33 is more easily to generate a deformation under the action of an electric field. It should be noted that the filling patterns 33 with different shapes may be prepared through using corresponding molds by the person skilled in the art, which is not to be described in detail here.

The filling pattern 33 is made of piezoelectric material, which may be any one chosen from piezoelectric crystal, piezoelectric ceramic, piezoelectric polymer and piezoelectric ceramic-polymer composite. However, the piezoelectric material is not limited to the several above-described materials, the piezoelectric material may be any other materials in the present embodiment if required.

Step III:

If the sealing frame 30 comprises the seal glue 34, in which the filling pattern 33 is filled, then there is a step III, comprising:

placing the filling pattern 33 in material of seal glue 34, applying them to the first electrode 31 and/or the second electrode 32 after being uniformly stirred, assembling the second substrate 20 to the first substrate 10, and forming the sealing frame 30 via thermal curing or ultraviolet light curing, meanwhile forming the liquid crystal panel. Or, placing the filling pattern 33 in material of seal glue 34, applying them to a position of the second electrode 20 corresponding to the sealing frame 30 after being uniformly stirred, assembling the second substrate 20 to the first substrate 10 formed with the first electrode 31 and the second electrode 32, and forming the sealing frame 30 via thermal curing or ultraviolet light curing, meanwhile forming the liquid crystal panel.

If the sealing frame 30 comprises the elastic cushion 35 and the seal glue 34 bonded with the elastic cushion 35, and the filling pattern 33 is filled in the elastic cushion 35, then there is a step III, comprising:

mixing the filling pattern 33 in material of elastic cushion 35, applying the elastic cushion 35 mixed with the filling pattern 33 to the first electrode 31 and/or the second electrode 32, and forming a pattern comprising the elastic cushion 35 by a patterning process; and applying the seal glue 34 to the second substrate 20 or the elastic cushion 35, and assembling the first substrate 10 to the second substrate 20 so that the seal glue 34 and the elastic cushion 35 are bonded to each other to form the sealing frame, meanwhile forming the liquid crystal panel. Or, mixing the filling pattern 33 in material of elastic cushion 35, applying the elastic cushion 35 mixed with the filling pattern 33 to the second substrate 20, and forming a pattern comprising the elastic cushion 35 by a patterning process; and applying the seal glue 34 to the second electrode 32 or the elastic cushion 35, and assembling the first substrate 10 to the second substrate 20 so that the seal glue 34 and the elastic cushion 35 are bonded to each other to form the sealing frame, meanwhile forming the liquid crystal panel.

It should be noted that, in the four above-described steps, the sequence of the steps I to III is insignificant, and the above-described sequence of the steps I to III is only exemplary, and not intended to limit the present embodiment. In the present embodiment, one of the above-described first substrate 10 and second substrate 20 is an array substrate, and the other is a color filter substrate. Of course, one of the first substrate 10 and the second substrate 20 may also be COA substrate, and the other is an assembly substrate. In the present embodiment, the first substrate 10 and the second substrate 20 are not limited.

As for the liquid crystal panel prepared by the manufacturing method according to the present embodiment, the filling pattern 33 made of the piezoelectric material is filled in the sealing frame 30, the filling pattern 33 generates a deformation under the action the electric field generated by applying a voltage to the first electrode 31 and the second electrode 32, and the electric field generated between two electrodes may be adjusted by adjusting the level of the applied voltage to the first electrode 31 and the second electrode 32, further the magnitude of the deformation of the filling pattern 33 may be adjusted, and finally the adjustment to the thickness of the liquid crystal panel in the peripheral area Q2 thereof may be achieved.

It should be understood that the above embodiments are merely exemplary embodiments intended to explain the principle of the present disclosure, however, the present disclosure is not limited thereto. Various modifications and alternatives may be made to the embodiments of the present disclosure without deviating from the spirit and scope of the present disclosure, and all the modifications and alternatives fall within the scope of the present disclosure.

What is claimed is:

1. A liquid crystal panel, comprising a first substrate, a second substrate arranged opposite to the first substrate, and a sealing frame disposed between the first substrate and the second substrate,
wherein the liquid crystal panel further comprises a first electrode, a second electrode and a plurality of filling patterns filled in the sealing frame,
the filling pattern is made of a piezoelectric material, and a size of the filling pattern is capable to be changed after the first electrode and the second electrode are applied with a voltage to generate an electric field, so as to adjust a height of the liquid crystal panel in a peripheral area thereof.

2. The liquid crystal panel according to claim 1, wherein one of the first electrode and the second electrode is disposed between the sealing frame and the first substrate, and the other of the first electrode and the second electrode is disposed between the sealing frame and the second substrate.

3. The liquid crystal panel according to claim 1, wherein both the first electrode and the second electrode are disposed between the first or second substrate and the sealing frame, and the first electrode and the second electrode are arranged alternately in a same one layer.

4. The liquid crystal panel according to claim 1, wherein both the first electrode and the second electrode are disposed between the first or second substrate and the sealing frame, and an insulation layer is provided between the second electrode and the first electrode, wherein the first electrode is a plate-shaped electrode and the second electrode is composed of a plurality of strip-shaped electrodes.

5. The liquid crystal panel according to claim 1, wherein the sealing frame comprises a seal glue, in which the filling pattern is filled.

6. The liquid crystal panel according to claim 1, wherein the sealing frame comprises an elastic cushion and a seal glue bonded with the elastic cushion, and the filling pattern is filled in the elastic cushion.

7. The liquid crystal panel according to claim 1, wherein the piezoelectric material is any one chosen from a piezoelectric crystal, a piezoelectric ceramic, a piezoelectric polymer and a piezoelectric ceramic-polymer composite material.

8. The liquid crystal panel according to claim 1, wherein the filling pattern has any shape chosen from a sphere, a cylinder, a cuboid and a circular truncated cone.

9. The liquid crystal panel according to claim 1, wherein the first substrate is a color filter substrate and the second substrate is an array substrate, or the first substrate is an array substrate and the second substrate is a color filter substrate.

10. A method for manufacturing a liquid crystal panel, the liquid crystal panel comprising a first substrate, a second substrate arranged opposite to the first substrate, and a sealing frame disposed between the first substrate and the second substrate, wherein the method comprises:
forming a first electrode, a second electrode and a sealing frame between the first substrate and the second substrate, wherein the sealing frame is filled with a filling pattern, and the filling pattern is made of a piezoelectric material, and a size of the filling pattern is capable to be changed after the first electrode and the second electrode are applied with a voltage to generate an electric field, so as to adjust a height of the liquid crystal panel in a peripheral area thereof.

11. The method according to claim 10, wherein the step of forming the first electrode and the second electrode between the first substrate and the second substrate comprises:
forming a pattern comprising one of the first electrode and the second electrode on the first substrate by a patterning process; and
forming a pattern comprising the other of the first electrode and the second electrode on the second substrate by a patterning process.

12. The method according to claim 10, wherein the step of forming the first electrode and the second electrode between the first substrate and the second substrate comprises:
forming a pattern comprising the first electrode and the second electrode on the first or second substrate by single patterning process, wherein the first electrode and the second electrode are composed of strip-shaped electrodes arranged alternately in a same one layer.

13. The method according to claim 10, wherein the step of forming the first electrode and the second electrode between the first substrate and the second substrate comprises steps of:
forming a pattern comprising one of the first electrode and the second electrode on the first substrate by a patterning process;
forming an inter-layer insulation layer; and
forming a pattern comprising the other of the first electrode and the second electrode by a patterning process, wherein the first electrode is composed of strip-shaped electrodes and the second electrode is a plate-shaped electrode.

14. The method according to claim 10, wherein the sealing frame comprises a seal glue, in which the filling pattern is filled, and the step of forming the sealing frame comprises:
producing the filling pattern by a solid phase method or a liquid phase method; and
placing the filling pattern in a material of a seal glue, coating them to the first substrate or the second substrate after being uniformly stirred, assembling the second substrate to the first substrate, and forming the sealing frame via thermal curing or ultraviolet light curing.

15. The method according to claim 10, wherein the sealing frame comprises an elastic cushion and a seal glue bonded with the elastic cushion, and the filling pattern is filled in the elastic cushion, wherein the step of forming the sealing frame comprises:
producing the filling pattern by a solid phase method or a liquid phase method;
mixing the filling pattern in a material of the elastic cushion, coating the elastic cushion mixed with the filling pattern to the first substrate or the second substrate, and forming a pattern comprising the elastic cushion by a patterning process; and
coating the seal glue so that the seal glue and the elastic cushion are bonded to each other to form the sealing frame.

16. The method according to claim 14, wherein the solid phase method is any one chosen from a phase method, a microwave radiation method, a mechanochemical method and a reaction sintering method; and the liquid phase method is any one chosen from a sol-gel method, a hydrothermal method and a precipitation method.

17. The method according to claim 15, wherein the solid phase method is any one chosen from a phase method, a microwave radiation method, a mechanochemical method and a reaction sintering method; and the liquid phase method is any one chosen from a sol-gel method, a hydrothermal method and a precipitation method.

18. The method according to claim 10, wherein the piezoelectric material is any one chosen from a piezoelectric crystal, a piezoelectric ceramic, a piezoelectric polymer and a piezoelectric ceramic-polymer composite material.

19. The method according to claim 10, wherein the filling pattern has any shape chosen from a sphere, a cylinder, a cuboid and a circular truncated cone.

20. The method according to claim 10, wherein the first substrate is a color filter substrate and the second substrate is an array substrate; or the first substrate is an array substrate and the second substrate is a color filter substrate.

* * * * *